US007945650B1

(12) United States Patent
Kracht

(10) Patent No.: US 7,945,650 B1
(45) Date of Patent: May 17, 2011

(54) IDENTIFYING MODULAR CHASSIS COMPOSITION BY USING NETWORK PHYSICAL TOPOLOGY INFORMATION

(75) Inventor: James E. Kracht, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 2602 days.

(21) Appl. No.: 09/922,175

(22) Filed: Aug. 1, 2001

(51) Int. Cl.
  *G06F 15/173* (2006.01)
  *G06F 15/177* (2006.01)
(52) U.S. Cl. ...................................... 709/223; 709/220
(58) Field of Classification Search .................. 710/105, 710/41; 709/245, 220–224; 719/321, 327
  See application file for complete search history.

(56) References Cited

U.S. PATENT DOCUMENTS 5,854,901 A * 12/1998 Cole et al. ..................... 709/245
6,415,314 B1 * 7/2002 Fee et al. ....................... 709/203
6,601,093 B1 * 7/2003 Peters ............................ 709/220

OTHER PUBLICATIONS

Cisco Integrated Communications System 7750 Data Sheet, Cisco Systems, Copyright 2000, p. 1-10.*
"Method and System for Executing, Tracking and Restoring Temporary Router Configuration Change Using a Centralized Database", 37 pp. Specification, 6 pp. Claims, 7 Shts. Drawings, 1 pg. Abstract, Kathail, et al., Oct. 12, 1999, U.S. Appl. No. 09/416,310.
"Method and System for Externally Managing Router Configuration Data in Conjunction with a Centralized Database", 35 pp. Specification, 15 pp. Claims, 8 Shts. Drawings, 1 pg. Abstract, Pradeep Kathail, Jan. 6, 2000, U.S. Appl. No. 09/479,607.
"Method and System for Verifying Configuration Transactions Managed by a Centralized Database", 32 pp. Specification, 6 pp. Claims, 7 Shts. Drawings, 1 Abstract, Kathail, et al., Oct. 12, 1999, U.S. Appl. No. 09/416,312.
"Subsystem Application Notification Method in a Centralized Router Database", 35 pp. Specification, 6 pp. Claims, 9 Shts. Drawings, 1 Abstract, Bion, et al., Oct. 12, 1999, U.S. Appl. No. 09/416,308.
"Controlling the Response Domain of a BootP/DHCP Server by using Network Physical Topology Information" 14pp. Specification, 5 pp. Claims, 7 shts. Drawings, 1 pg. Abstract, Huey, et al., Jul. 24, 2001, U.S. Appl. No. 09/912,852.
"Method and Apparatus for IP Address Assignment", 8 pp. Specification, 8 pp. Claims, 5 Shts. Drawings, 1 Abstract, Huo, et al., Sep. 5, 2001, U.S. Appl. No. 09/947,595.
"Use of Non-Volatile Memory Devices as Read/Write Devices during Bootstrapping and Similar Uses", 15 pp. Specification, 7 pp. Claims, 4 Shts. Drawing, 1 Abstract, Jainendra Kumar, Dec. 27, 2000, U.S. Appl. No. 09/751,3448.

* cited by examiner

*Primary Examiner* — Kamal B Divecha
(74) *Attorney, Agent, or Firm* — Brinks Hofer Gilson & Lione

(57) ABSTRACT

A method and apparatus for identifying internal occupants of a communications system apparatus with an Ethernet backplane and at least one internal occupant. The method comprising: verifying that a system switch processor ("SSP") has been assigned an IP address; requesting a discovery protocol data package from the SSP; determining whether the package corresponds to at least one internal occupant; and if the package corresponds to the internal occupant, then discovering occupant information corresponding to the internal occupant. The apparatus comprising means for verifying that a system switch processor ("SSP") has been assigned an IP address; means for requesting a discovery protocol data package from the SSP; means for determining whether the package corresponds to at least one internal occupant; and if the package corresponds to the internal occupant, then means for discovering occupant information corresponding to the internal occupant.

18 Claims, 13 Drawing Sheets

600

|   | 1 | 2 | 3 | 4 | 5 | 6 | 7 | 8 |                    |
|---|---|---|---|---|---|---|---|---|--------------------|
|   |   |   |   |   |   |   |   |   | IP ADDRESS         |
|   |   |   |   |   |   |   |   |   | MAC ADDRESS        |
|   |   |   |   |   |   |   |   |   | SYSTEM NAME        |
|   |   |   |   |   |   |   |   |   | SNMP COMM. STRING  |
|   |   |   |   |   |   |   |   |   | PASSWORDS          |
|   |   |   |   |   |   |   |   |   | USERNAMES          |
|   |   |   |   |   |   |   |   |   | WICS               |
|   |   |   |   |   |   |   |   |   | VICS               |
|   |   |   |   |   |   |   |   |   | OPTIONAL DATA ITEM |

FIG. 6

IDENTIFYING MODULAR CHASSIS COMPOSITION BY USING NETWORK PHYSICAL TOPOLOGY INFORMATION

BACKGROUND OF INVENTION

1. Field of Invention

The present invention relates to the remote configuring of a modular network system that can process voice and data communications.

2. The Background Art

The widespread use and acceptance of the Internet has generated much excitement, particularly among those who see advantages in networking their voice and data communications in an Integrated Communications System ("ICS"). The ICS is often comprised of a manufacturer's proprietary system, thus in order to set up and maintain the ICS, a computer network specialist trained and certified in the manufacturer's proprietary system is needed. Due to the nature and importance of keeping the computer network online and working properly, the computer network specialist is often a permanent employee of the business entity installing and maintaining the ICS.

An ICS known in the art is shown FIG. 1a. The ICS system 100 is comprised of an ICS chassis 110 which is further comprised of at least one internet router 116 known in the art. The user 120, usually a trained and certified computer network specialist, sets up and configures the ICS 110 which may involve the selection of the proper network and router cards for the ICS chassis 110, the assignation of IP addresses for the various components within the ICS chassis, and the verification of proper communication between the ICS chassis and various hardware components such as IP telephones, personal computers, and IP video. This direct configuration and set up by the user is represented by the arrow 150. Once the ICS chassis 110 is set up and configured by the user 120, then ICS 110 can be operatively coupled to the internet 130, often via a internet browser standard in the art such as Netscape or Internet Explorer. Said coupling is represented by the connector 154. Once the ICS chassis is configured, the user can operatively couple to the internet, illustrated by the connector 158, often via an internet browser standard in the art, and contact the vendor 140, who is also operatively coupled to the internet, illustrated by connector 162, often via an internet browser standard in the art. If the user then provides accurate configuration and set up information to the vendor, the vendor can remotely assist the user in further configuring and troubleshooting the ICS chassis 110 via the internet.

Although having an on-site computer network specialist may not present a problem to large business enterprises, small to medium sized business often cannot justify the cost of hiring a dedicated computer network specialist to maintain an ICS. In order to provide a low cost and effective ICS for small to midsize businesses, an ICS is desired that does not require a highly trained computer network specialist to be on staff with that business.

SUMMARY OF THE INVENTION

The present invention is directed towards a method and apparatus for identifying internal occupants of a communications system chassis with an Ethernet backplane and at least one internal occupant. The method comprises: verifying that a system switch processor ("SSP") has been assigned an IP address; requesting a discovery protocol data package from the SSP; determining whether the discovery protocol data package corresponds to at least one internal occupant; and if the discovery protocol data package corresponds to the at least one internal occupant, then discovering occupant information corresponding to the at least one internal occupant. The apparatus comprises the means for verifying that a system switch processor ("SSP") has been assigned an IP address; means for requesting a discovery protocol data package from the SSP; means for determining whether the discovery protocol data package corresponds to at least one internal occupant; and means for discovering occupant information corresponding to the at least one internal occupant if the discovery protocol data package corresponds to the at least one internal occupant.

The present invention is also directed towards a method and apparatus for cyclically identifying occupants of a communications system chassis with an Ethernet backplane and at least one internal occupant. The method comprises: requesting a link status from a SSP; determining whether all of the at least one internal occupant in the communications system chassis have been discovered; waiting for next cycle if all of the at least one internal occupant in the communications system chassis have been discovered; determining whether the link status corresponds to the at least one internal occupant, if all of the at least one internal occupant in the communications system have not been discovered; determining whether the link status is up and a slot corresponding to the link is not occupied, if the link status corresponds to the at least one internal occupant; launching a slot discovery, if the link status is up and the slot corresponding to the link is not occupied; determining whether the link status is down and the slot corresponding to the link status is occupied, if the link status is not up and the slot is not occupied; and identifying the at least one internal occupant as non-operational, if the link status is down and the slot is occupied. The apparatus comprises the means for requesting a link status from a SSP; means for determining whether all of the at least one internal occupant in the communications system chassis have been discovered; means for waiting for next cycle if all of the at least one internal occupant in the communications system chassis have been discovered; means for determining whether the link status corresponds to the at least one internal occupant, if all of the at least one internal occupant in the communications system have not been discovered; means for determining whether the link status is up and a slot corresponding to the link is not occupied, if the link status corresponds to the at least one internal occupant; means for launching a slot discovery, if the link status is up and the slot corresponding to the link is not occupied; the means for determining whether the link status is down and the slot corresponding to the link status is occupied, if the link status is not up and the slot is not occupied; and means for identifying the at least one internal occupant as non-operational, if the link status is down and the slot is occupied.

The invention is further directed towards a method and apparatus for cyclically identifying occupants of a communications system chassis with an Ethernet backplane and at least one occupant installed in at least one slot. The method comprises: requesting a discovery protocol data package from a SSP; determining whether all of the at least one slot in the communications system chassis have been discovered; marking the at least one slot that have no DISCOVERY PROTOCOL information as empty, then waiting for a next cycle to begin, if all of the at least one slot in the communications system chassis have been discovered; determining whether the discovery protocol data package corresponds to the at least one internal occupant, if one of the at least one slot in the communications system chassis has not been discovered; determining whether the discovery protocol data package is consistent with a discovery protocol data package previously obtained, if the discovery protocol data package corresponds to the at least one internal occupant; and launching a slot discovery, if the discovery protocol data package is not consistent with the previously obtained discovery protocol data package. The apparatus comprises: means for requesting a discovery protocol data package from a SSP; means for determining whether all of the at least one slot in the communications system chassis have been discovered; means for marking the at least one slot that have no DISCOVERY PROTOCOL information as empty, then waiting for a next cycle to begin, if all of the at least one slot in the communications system chassis have been discovered; means for determining whether the discovery protocol data package corresponds to the at least one internal occupant, if one of the at least one slot in the communications system chassis has not been discovered; means for determining whether the discovery protocol data package is consistent with a discovery protocol data package previously obtained, if the discovery protocol data package corresponds to the at least one internal occupant; and means for launching a slot discovery, if the discovery protocol data package is not consistent with the previously obtained discovery protocol data package.

BRIEF DESCRIPTION OF THE DRAWINGS

The present invention is described in greater detail by referencing the accompanying drawings.

FIG. 6 is a representation of one embodiment of a data table.

DETAILED DESCRIPTION

Figure 1A:
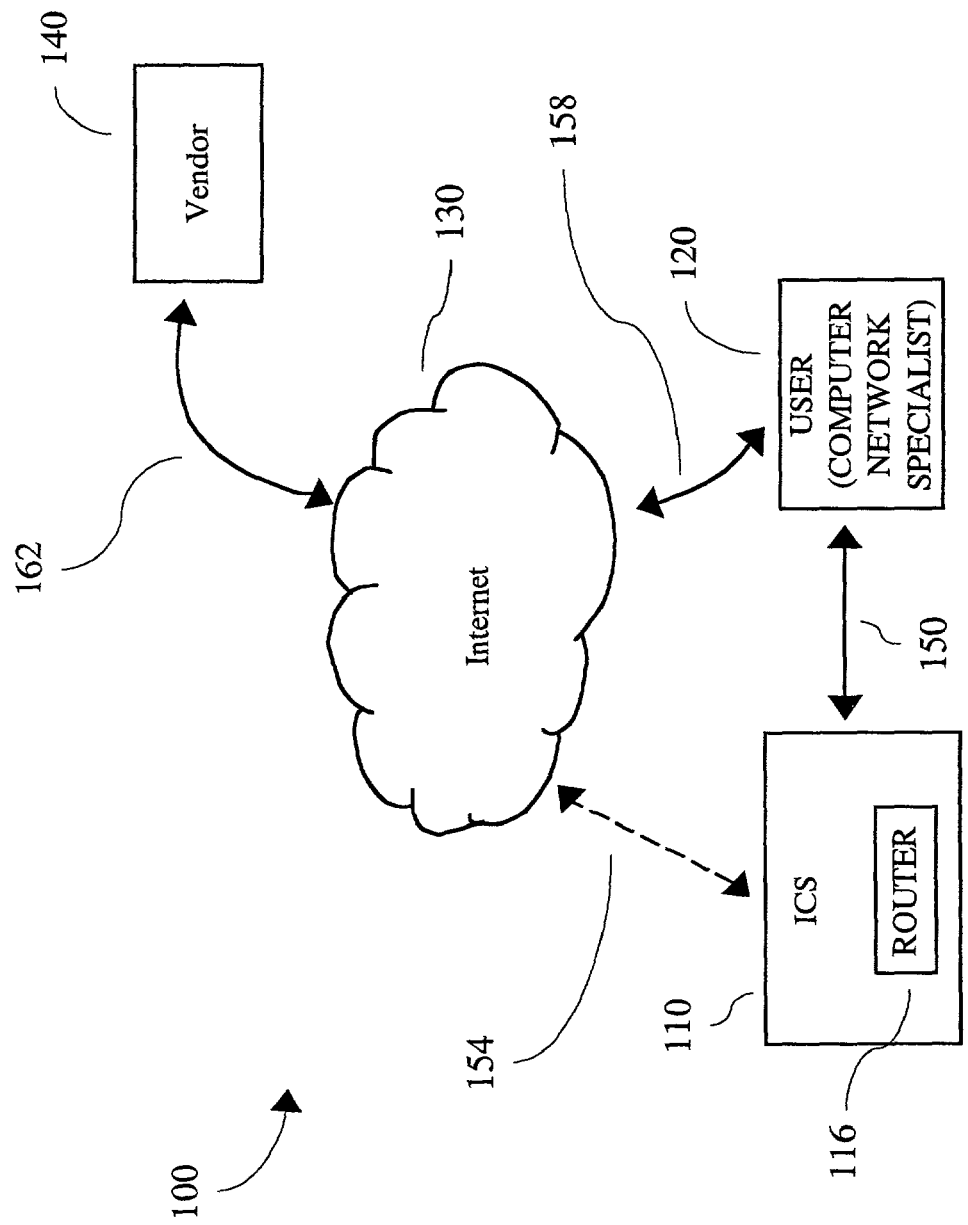
FIG. 1a is a representation of a prior art communication system.
Figure 1B:
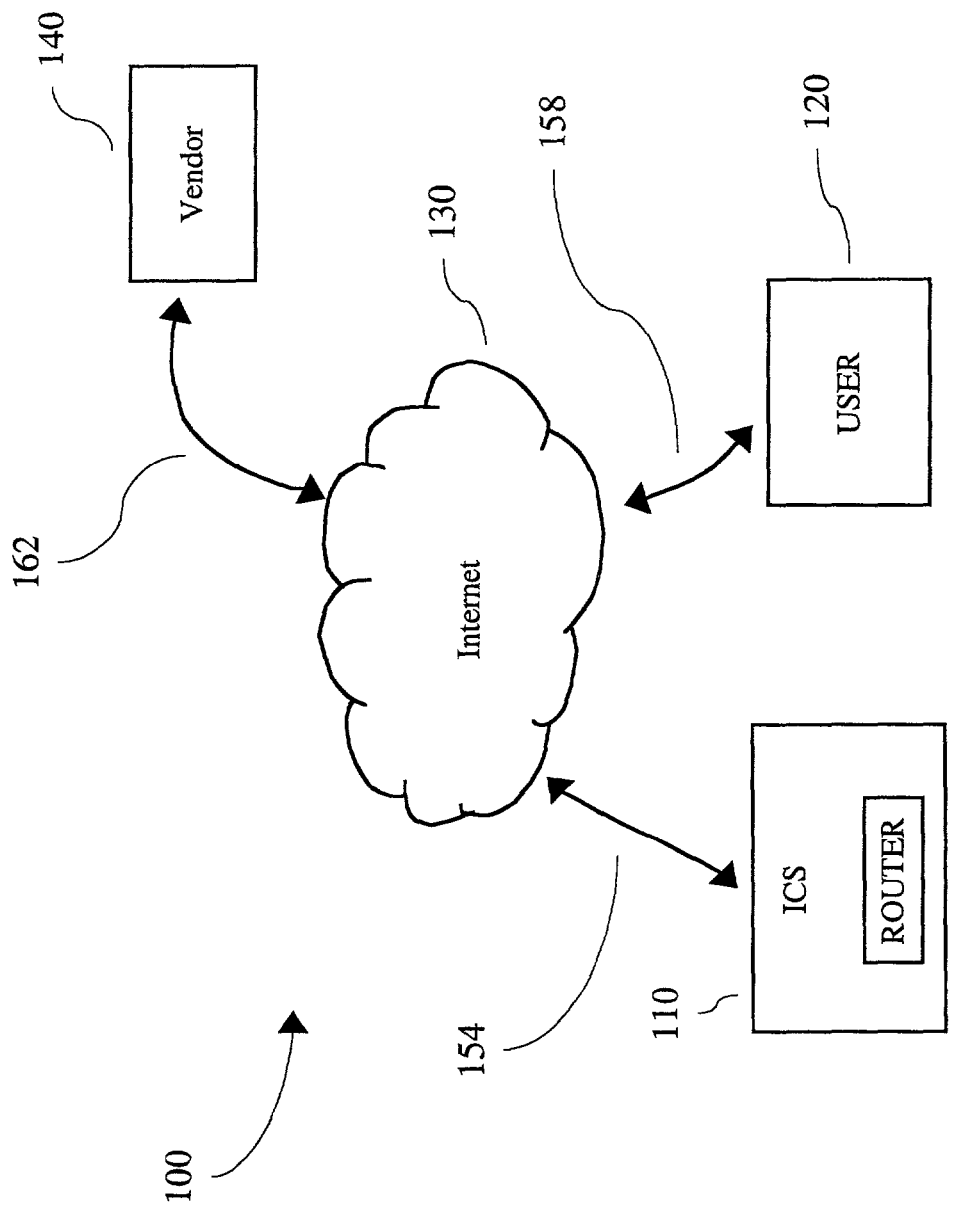
FIG. 1b is a representation of the disclosed communications system.
Figure 2:
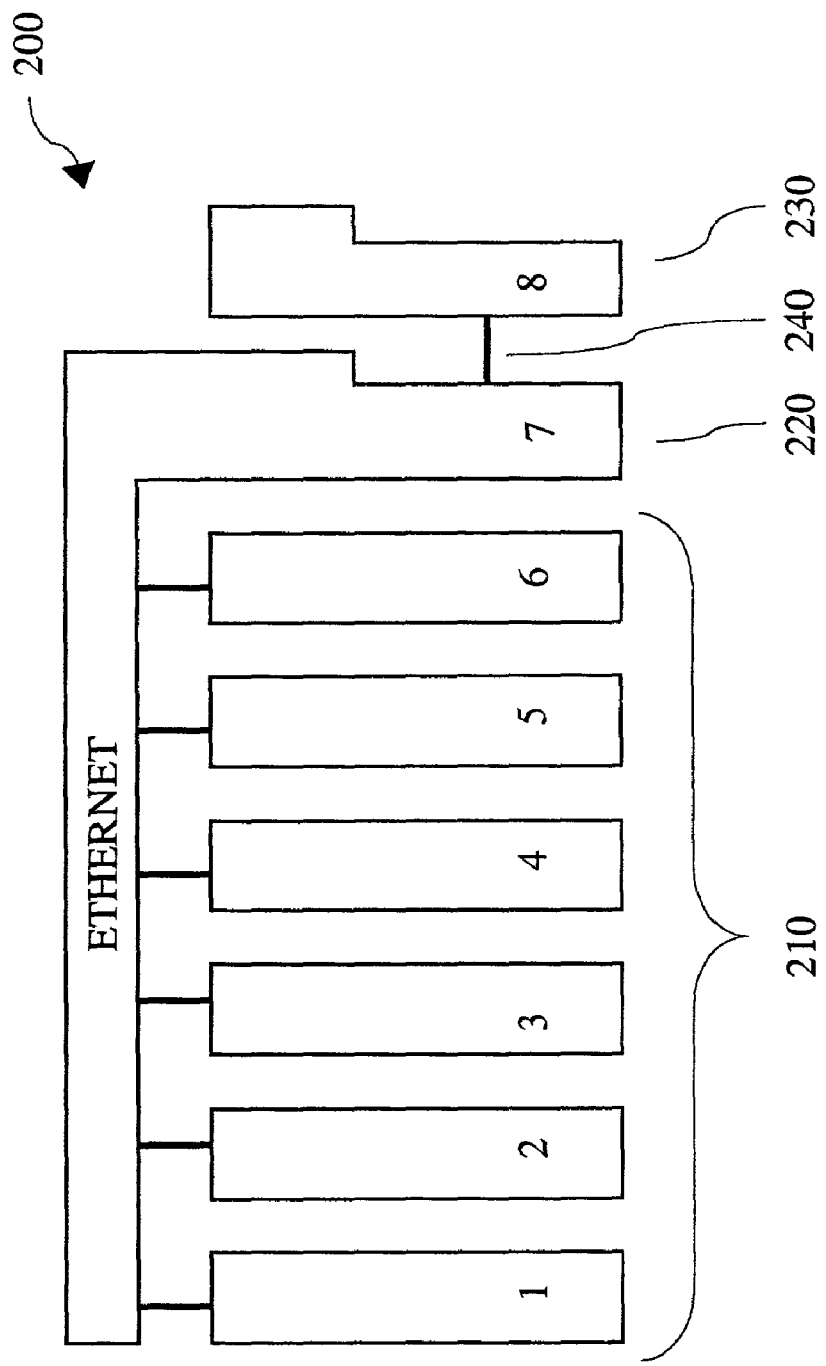
FIG. 2 is a representation of communications system chassis.

Those of ordinary skill in the art will realize that the following description of the present invention is illustrative only and not in any way limiting. Other embodiments of the invention will readily suggest themselves to such skilled persons.
Overview of System Referring to FIG. 1b, an ICS 110 may be operationally coupled to the internet 130 upon boot up without the need of the user 120 to set up and configure the ICS. Once booted up, the user can connect to the internet, illustrated by a connector 154, via an internet browser standard in the art, and communicate with the vendor 140 who may be operationally coupled to the internet, illustrated by connector 162. Connector 158 represents the user's connection to the internet. In another aspect of the disclosed system, the user may connect to the internet via the ICS, once the ICS is booted up. The user can then instruct the vendor, via the internet, to initiate a configuration and set up of the ICS. The vendor may also provide an act by act menu which may assist the user and vendor in configuring the ICS.
Exemplary ICS Chassis FIG. 2 shows a representation of an ICS chassis 200 with 8 card slots. Other configurations are possible with differing numbers and types of slots. In this specification and the following claims an exemplary 8 slot ICS chassis is used for illustrative purposes, but an ICS Chassis may be configured with both more and less slots as well as different slot types. The first six card slots 210, are numbered 1 through 6, and may interchangeably house various cards selected by the user. The cards that can be selected by the user for slots 1 through 6 include multiservice route processor cards ("MRP") and system processing engine cards ("SPE").

A MRP is a voice and data capable router that can carry voice traffic over an IP network and can link small to medium size remote Ethernet LANs to central offices over WAN links. A MRP has two slots that support WAN interface cards ("WICs"), voice WAN interface cards ("VWICs"), and voice interface cards ("VICs"); two packet voice data module ("PVDM") slots for adding digital signal processors ("DSPs"); a dual inline memory module ("DIMM") slot for upgrading MRP memory; and a socket for a Virtual Private Network ("VPN") module.

A SPE is a single board computer that runs system software applications such as Cisco Systems, Inc.'s ICS 7700 System Manager and Cisco Systems, Inc. CallManager. At least two types of SPEs are manufactured by Cisco Systems, Inc. which can be installed in slots 1 through 6: Cisco Systems, Inc.'s model SPE 310 which has a 700-MHz Pentium III processor, a 20.4-GB hard disk drive, up to 1.5 GB of memory, a keyboard port, two universal serial bus ("USB") ports, and a video port, and Cisco Systems, Inc.'s model SPE 200 which has a 266-MHz Pentium II processor, a 6-GB hard disk drive, and 512 MB of memory.

Slot 7, 220, may be dedicated to a system switch processor ("SSP") which is an Ethernet switch that passes data among all cards in the ICS chassis 200 and to any other Ethernet switches connected to the system. Slot 7, 220, is designed to house an SSP which is an Ethernet switch, thus slot 7, 220, is represented in FIG. 2 as being operationally coupled via the Ethernet switch to slots 1 through 6, 210. Slot 7, 220, may be directly coupled to slot 8, 230. Said coupling is represented by connector 240.

Slot 8, 230, may be dedicated to a system alarm processor card ("SAP") which is a module that monitors the status of the chassis, power supply modules, and fans, and feeds real-time data to the SPEs. The cards occupying slots 1 through 8 are referred to as internal occupants. The SSP may be operationally coupled to other network devices that are not within the ICS chassis system.

The cards which occupy slots 1 through 7 in the ICS chassis may have a built in discovery protocol known in the art such as the Cisco Discovery Protocol ("CDP"). CDP is a network protocol for discovering neighboring devices. Each card in slots 1 through 7 of the ICS chassis is a CDP-compatible device which sends periodic messages to the SSP. Among the CDP information sent to the SSP with respect to each card are the following: the IP address assigned to each card; and the platform string for each card, which specifies what the card is, i.e. an SPE and an MRP. CDP is just one discovery protocol known in the art, and is used in this specification and these claims for non-limiting illustrative purposes. This system may also use other discovery protocols The SSP also records the interface information of each card in the ICS chassis. The interface information is not usually part of a CDP data package. The SSP determines the interface information of each card in the ICS chassis by observing which of its own interfaces the data packet from that card arrives on in the network. This interface information is then grouped with the overall information kept internally in the SSP and is available for probing management applications. The interface information of each card allows one to determine which slot in the ICS chassis the card is located in.

Figure 3:
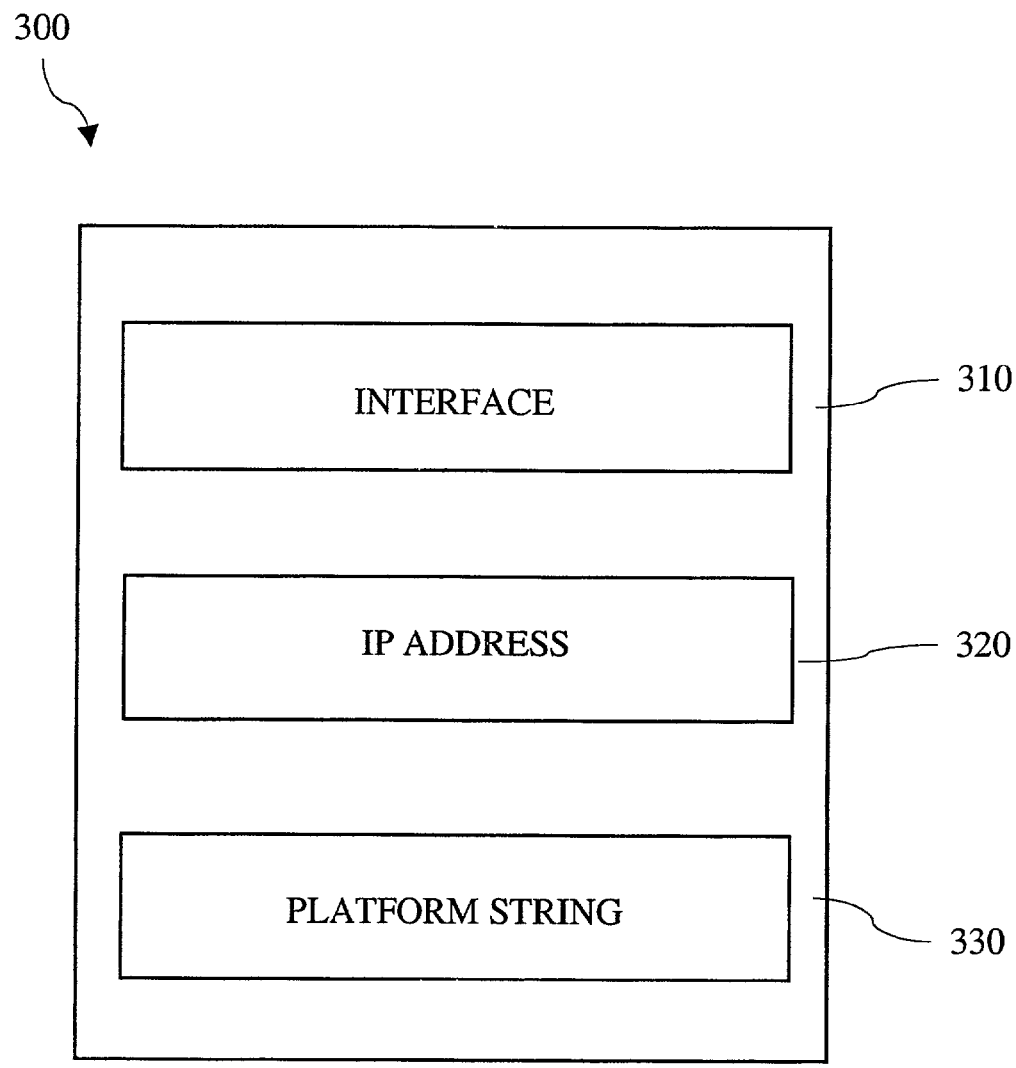
FIG. 3 is a representation of a discovery protocol data package.

FIG. 3 shows a CDP data package 300 as obtained from the SSP. The information stored in the data package 300 for each card in the ICS chassis includes an interface information 310, an IP address 320, and a platform string 330.

Exemplary Operations of the Disclosed System

An aspect of a disclosed system may identify the modular ICS chassis composition through the use of a computer algorithm disposed on an SPE housed in the ICS chassis. Another aspect of the disclosed system is to communicate a query to the SSP requesting at least one CDP data package it has stored with regards to the cards installed in the ICS chassis. It is contemplated that the various aspects of the disclosed system may also communicate with the SSP and other occupants in the ICS chassis. One example of the method of communicating between the various aspects of the disclosed system is via standard network communications.

Non-limiting examples of such communications are Hypertext Transfer Protocol ("HTTP") and Simple Network Management Protocol ("SNMP"). HTTP is the communication protocol used for transmitting data between servers and clients (browsers) on the World Wide Web. HTTP also has variants, such as Secure HyperText Transfer Protocol ("SHTTP") and one based on the Secure Sockets Layer ("SLL") where URLs are addressed HTTPS. The SNMP is an application-layer protocol that facilitates the exchange of management information between network devices and it is part of the Transmission Control Protocol/Internet Protocol ("TCP/IP") protocol suite. SNMP enables network administrators to manage network performance, find and solve network problems, and plan for network growth.

Figure 4:
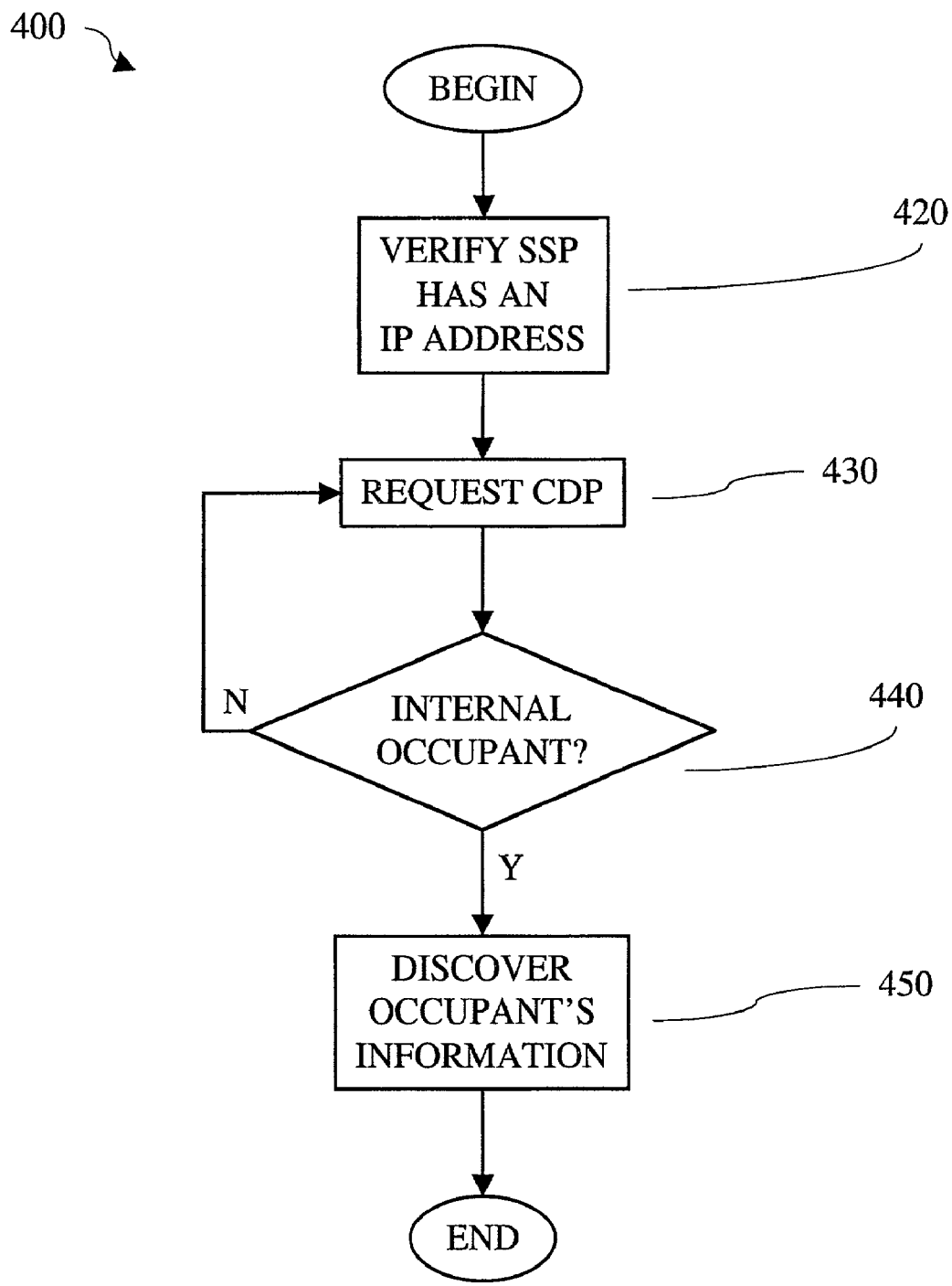
FIG. 4 is a flowchart representing an aspect of the disclosed system.

Referring to FIG. 4, there is shown generally the steps of an algorithm 400 for discovering the modular chassis composition of an ICS chassis. Once the ICS unit is booted up, the algorithm begins. At act 420, the system verifies that the SSP has been assigned an IP address. The system does not proceed to the next act until the system knows the SSP has an IP address. Thus, act 420 may also be described as the system waiting for the SSP to be assigned an IP address. The SSP is assigned an IP address as disclosed by patent application Ser. No. 09/912,852, entitled "Controlling the Response Domain of a BOOTP/DHCP Server By Using Network Physical Topology Information", filed on Jul. 24, 2001, and assigned to the Applicant, incorporated herein by reference in its entirety. Once the SSP has an IP address, it may keep a record of that address in its own non-volatile memory, so that when it is rebooted it may remember what its IP address should be (unless the non-volatile memory is erased through a command given to the SSP).

Once the SSP is assigned its IP address, the system requests a CDP data package (300 in FIG. 3) from the SSP at act 430.

At query 440, the system determines whether the data package corresponds to an internal component of the ICS chassis. In one aspect of the disclosed system, an internal component may correspond to an occupant of the 6 modular slots of the ICS chassis. If at query 440, the system determines that the component is not an internal occupant, the system goes back to act 430 to request another CDP data package.

If at query 440, the system determines that the component is an internal component, the system performs a further discovery act 450. In one aspect of the system, act 450 may be a direct communication by the system with the said component. Said direct communication is available to the system because the system at act 430 has received the CDP data package from the SSP concerning said component. In an aspect of the system, that CDP data package provides the component's IP address and platform string to the system, allowing the system to directly communication with the said component via the aforementioned standard network communications.

Figure 5:
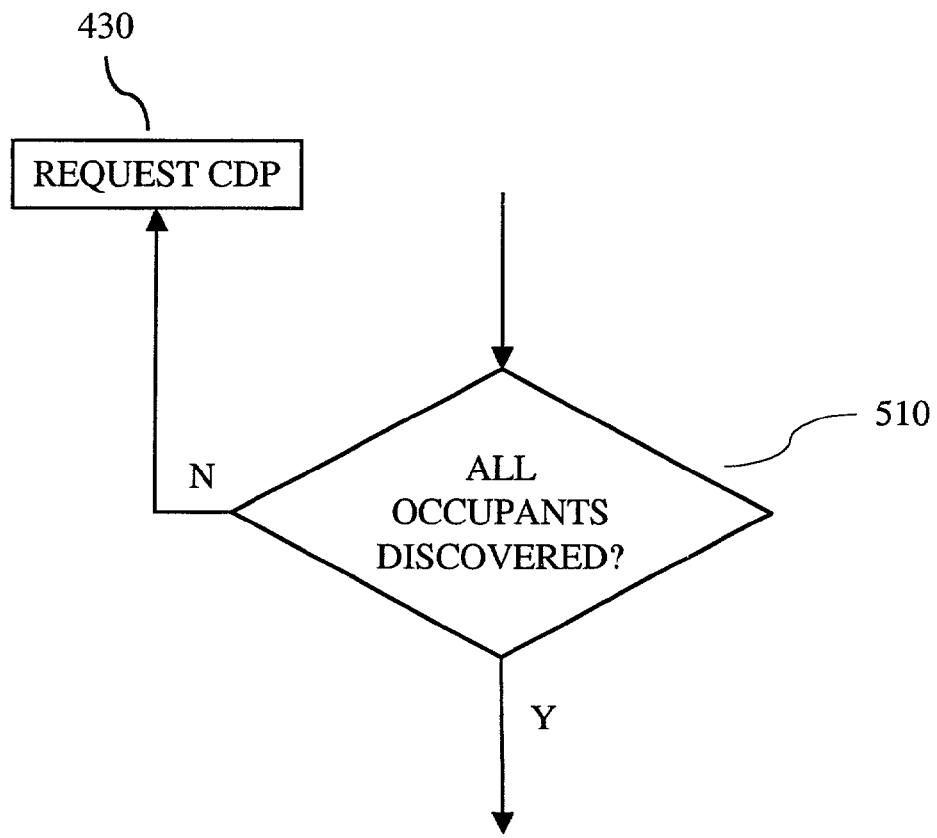
FIG. 5 is a flowchart representing an aspect of the disclosed system.

In another aspect of the disclosed system, referring to FIG. 5, an additional query 510 is added to the disclosed system. At query 510, the system determines whether it has performed a discovery on all the internal occupants. If a discovery has been performed on all the occupants, the disclosed system ends. If a discovery has not been performed on all the occupants, the algorithm returns to act 430 of FIG. 4 to request another CDP data package.

Figure 7:
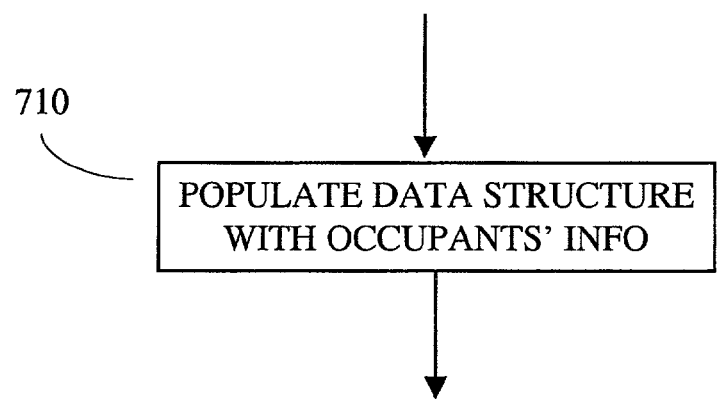
FIG. 7 is a flowchart representing an aspect of the disclosed system.

Another aspect of the system, is to populate a data table with the discovery information it receives for each of the internal occupants. Referring to FIG. 6, one embodiment of a data table 600 is shown. There are 8 columns, each column corresponding to one of the eight slots in an ICS chassis. For each column, certain data are saved, these data include, without limitation the following: IP Address, MAC address, System Name, SNMP community string, passwords, usernames, WICS, VICS, and other optional data items. Having discovered the said certain data, it may be useful to store the said certain data in a retrievable storage device. Referring to FIG. 7, a flowchart of an additional aspect of the disclosed system is shown. In FIG. 7, the discovered information may be stored for use later at act 710. In one disclosed aspect, the system may populate a table as shown in FIG. 6 as the discovery process progresses.

Figure 8:
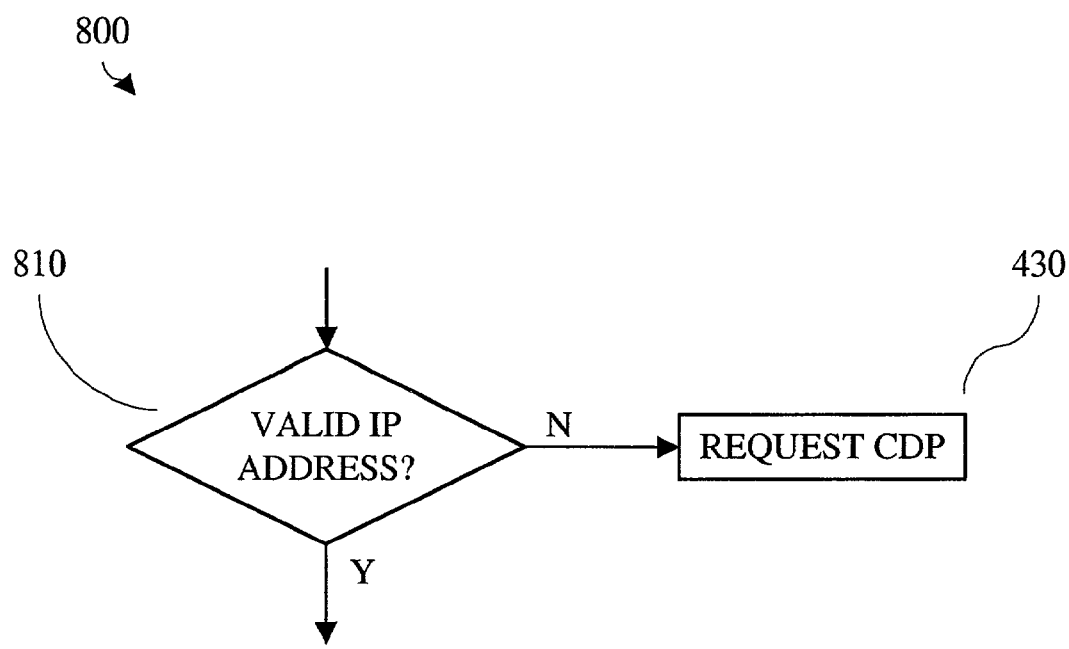
FIG. 8 is a flowchart representing an aspect of the disclosed system.

One problem in the art is that either due to misconfiguration of the occupants for an ICS chassis or due to transitional states of those occupants, the occupants have a default IP address, which is normally not a valid IP address which would allow other devices to communicate with it via standard network communications. Thus, an other aspect of the disclosed system is to solve said problem by verifying that an occupant's IP address is valid. Referring to FIG. 8, an aspect of the disclosed system is to add the additional act 810 to the algorithm shown in FIG. 4 immediately after act 440. In act 810, the system determines if the particular occupant's CDP data package contains a valid IP address for said particular occupant. If at act 810, the determination is that the IP address is not valid, the algorithm returns to act 430 of FIG. 4. If it is determined at act 810 that the occupant has a valid IP address, the algorithm continues to act 450 of FIG. 4.

Figure 9:
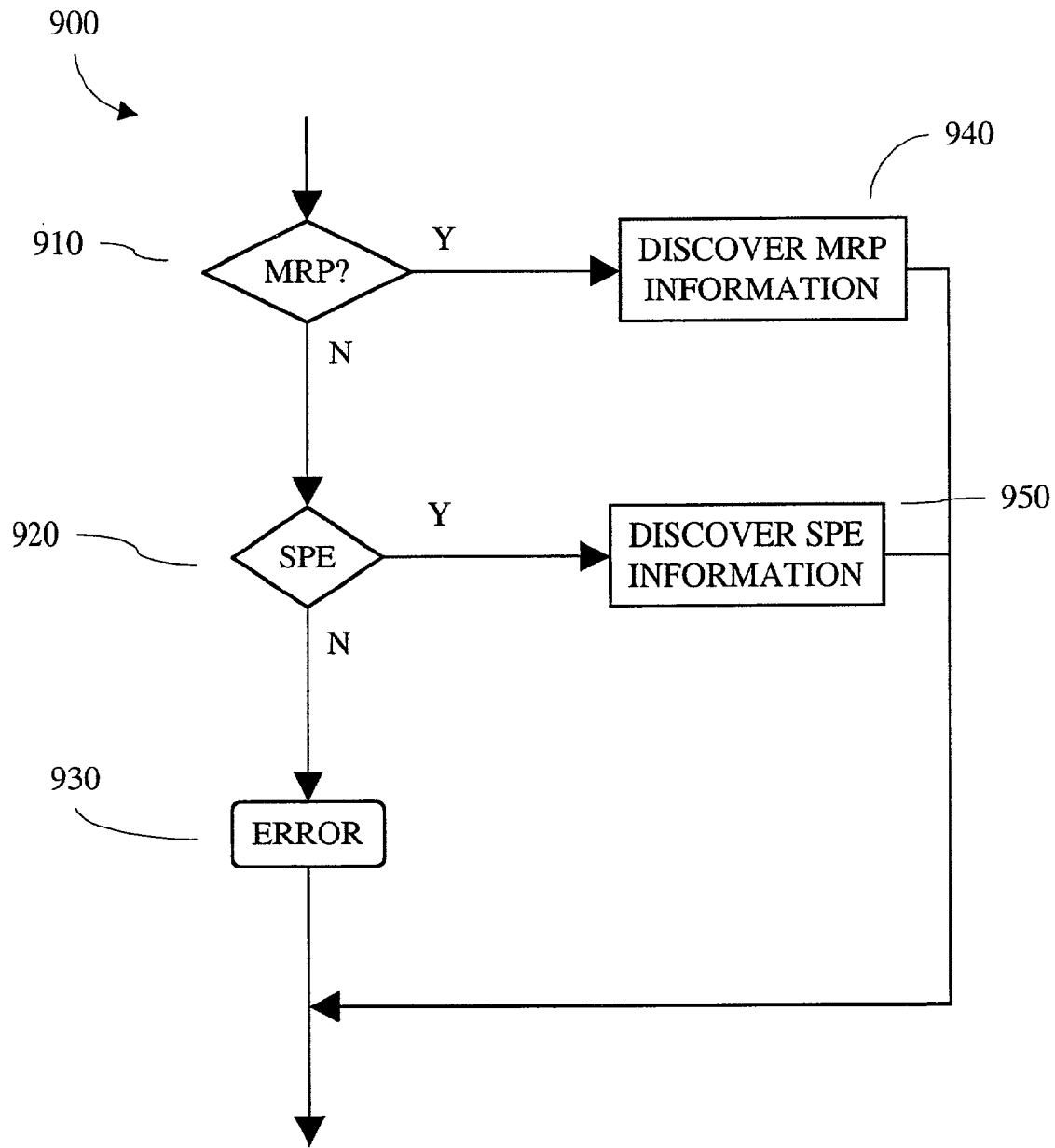
FIG. 9 is a flowchart representing an aspect of the disclosed system.

Referring to FIG. 9, a more detailed flowchart of a method for discovery is shown. The process begins in act 910, where it is determined whether the chassis occupant is an MRP. If the chassis occupant is an MRP, the algorithm discovers further MRP information from the occupant at act 940. Such information may include, but is not limited to: what WICs may be installed, what VWICs may be installed, what VICs may be installed, what PVDMs may be installed, what DIMMs may be installed, and what VPNs may be installed.

If it is determined at act 910 that the chassis occupant is not an MRP, then at act 920 it is determined whether the chassis occupant is an SPE. If the chassis occupant is a SPE, the algorithm discovers further SPE information from the chassis occupant at act 950. Such SPE information may include, but is not limited to what Address Resolution Protocols ("ARP") are known (ARP is a protocol the Internet may use to relate a network layer 3 address [IP address] with a specific layer 2 address [MAC address]), what model SPE is installed as said chassis occupant, what type of CPU is installed in the SPE, what size hard disk drive is installed in the SPE, what operating system is installed on the SPE, how much memory is installed in the SPE, and what sort of ports are installed in the SPE. If the chassis occupant is not an SPE, the algorithm notes that there is an error with the occupant because it is an unidentified occupant.

Figure 10:
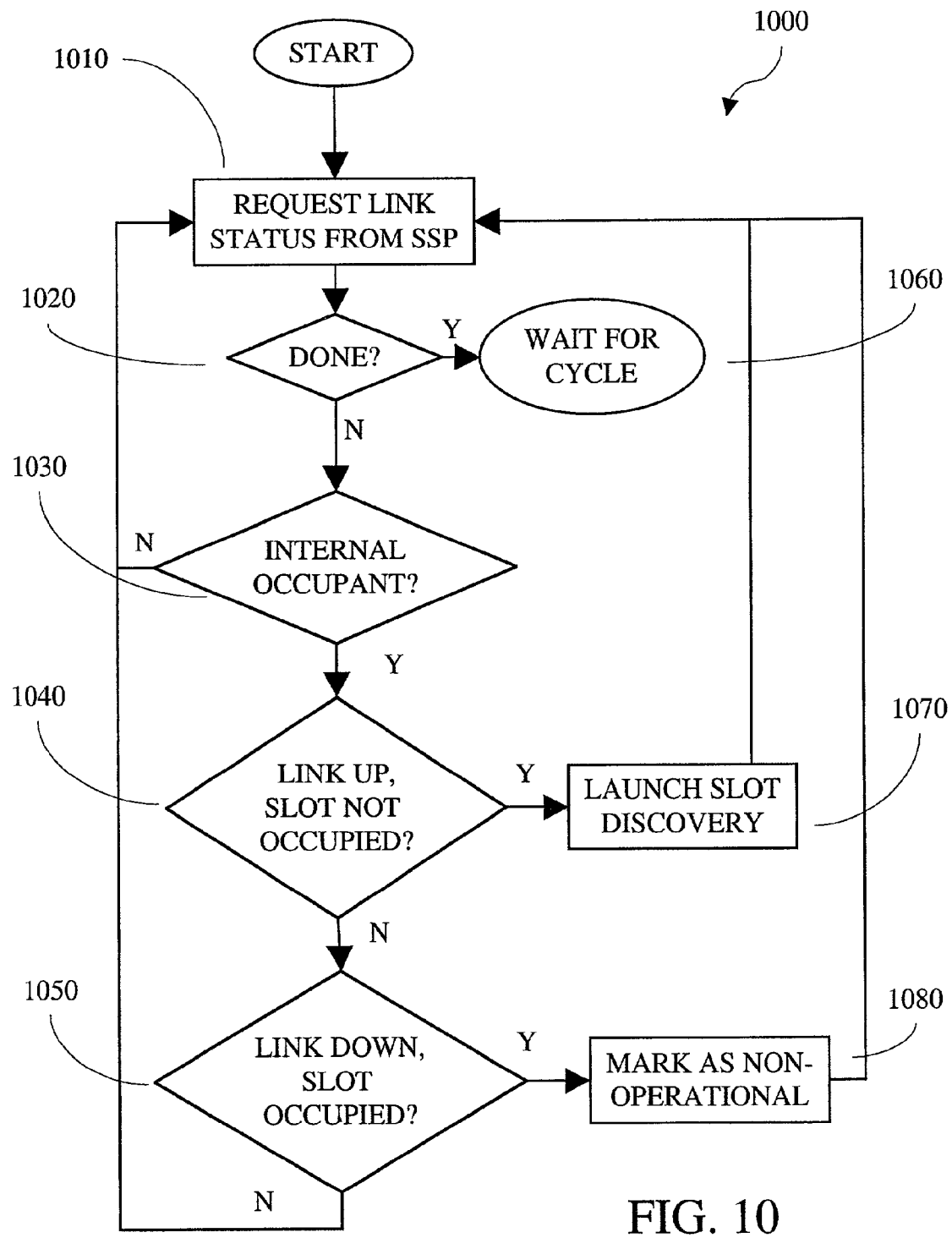
FIG. 10 is a flowchart representing an aspect of the disclosed system.

Users may change cards in the ICS chassis, so it may be desirable to periodically update the discovery information in the data table. Referring to FIG. 10, another aspect of the system is to have an ongoing discovery process 1000 that repeats periodically. Each periodically repeating discovery process may be referred to as a cycle having a length of time for each period between 5 minutes and 1 second, with typical time periods being 15 and 30 seconds long, though any amount of time may be desired. At act 1010, the algorithm requests from the SSP a link status. As is known by those of ordinary skill the in the art, a link status indicates if an occupant is properly connected to the Ethernet backplane. At act 1020, the algorithm determines whether all of the internal occupants have gone through the periodically repeating discovery process, if they have, then the algorithm waits for the next cycle.

If all of the internal occupants have not gone through the periodically repeating discovery process, then the algorithm determines if the requested link status corresponds to an internal occupant at act 1030. If the link status does not correspond to an internal occupant, the algorithm goes back to act 1010. In another aspect of the disclosed system, if the link status does correspond to an internal occupant, then the algorithm determines at act 1040 whether the following two conditions occur: (1) link status is up, but (2) the slot was not known to be occupied. These two conditions can occur if the user installs a card into the ICS chassis after boot up or if the user replaces a card in the ICS chassis after boot up.

If the link status is up and the slot is not occupied, the algorithm launches a slot discovery at act 1070 for the slot that appears to be newly occupied with some yet unknown occupant (since the link is up), then it goes back to act 1010.

If the two conditions are not both satisfied at act 1040, then the algorithm determines at act 1050 if the following two conditions occur: (1) link is down, and (2) slot is occupied. If those two conditions are satisfied, then the algorithm marks the slot as non-operational, i.e., removes the component in that slot from the active inventory, at act 1080 and goes back to act 1010.

Figure 11:
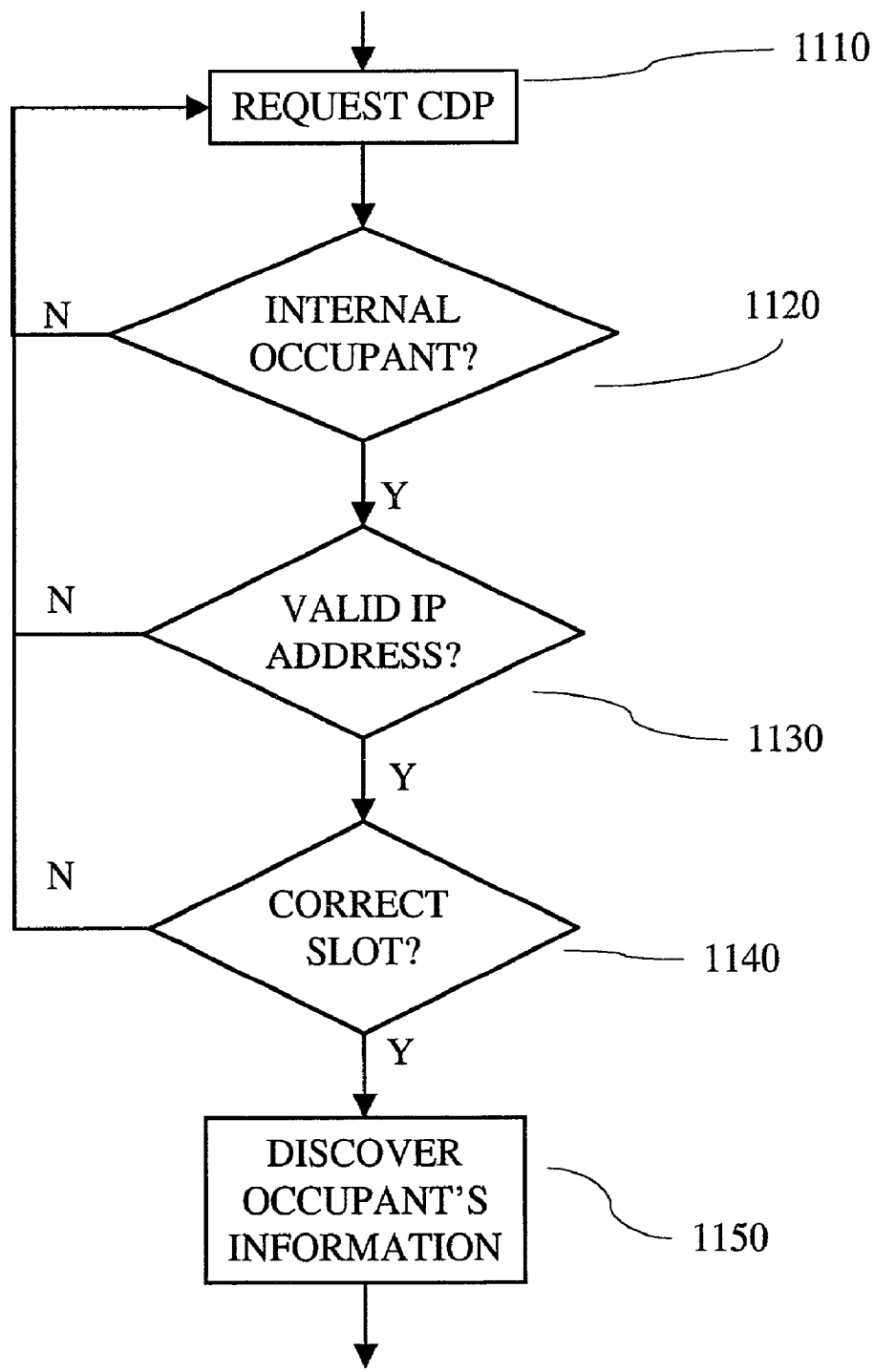
FIG. 11 is a flowchart representing an aspect of the disclosed system.

Another aspect of the system, is that the slot discovery referred to in act 1070 of FIG. 10, may further be comprised of the steps shown in FIG. 11. At act 1110, the algorithm requests a CDP data package form the SSP. The algorithm then determines whether the occupant associated with the CDP data package is an internal occupant at act 1120. If the CDP data package is associated with an internal occupant, the algorithm then determines whether the internal occupant has been assigned a valid IP address at act 1130. If the occupant has been assigned a valid IP address, the algorithm then determines whether the occupant is an occupant of the same slot associated with the link status requested in act 1010 of FIG. 10. If the occupant is associated with the same said slot, then the algorithm performs the act 1150 of discovering the occupant's information by directly communicating with the occupant.

Referring to FIG. 11, another aspect of the system is that act 1150 may further be comprised of the steps shown in FIG. 9.

Figure 12:
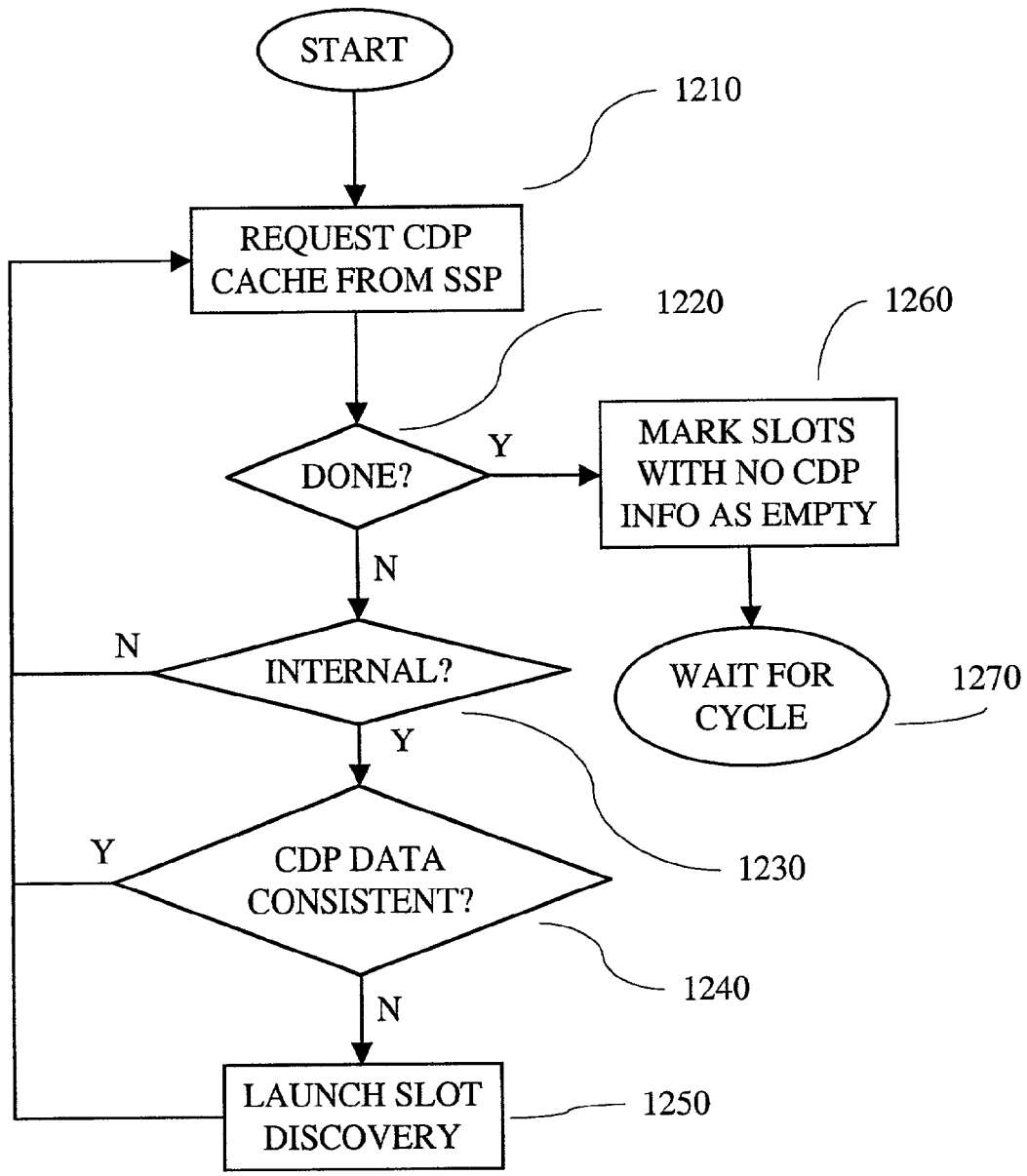
FIG. 12 is a flowchart representing an aspect of the disclosed system.

Another aspect of the system is to have an ongoing discovery process that repeats periodically, but requests CDP data packages rather than link status. The time of each period may be between 5 minutes and 1 second, with typical time periods being 15 and 30 seconds long, but any time period may be desired. Each periodically repeating discovery process may be referred to as a cycle. Referring to FIG. 12, the algorithm begins by requesting a CDP data package from the SSP at act 1210. At act 1220, the algorithm determines whether all of the internal occupants have gone through the periodically repeating discovery process, if they have, then at act 1260 the algorithm marks as empty those slots with no CDP information. At act 1270, the algorithm waits for the next cycle. However, if the all of the internal occupants have not gone through the periodically repeating discovery process, then the algorithm at act 1230 determines whether the occupant is an internal occupant. If the occupant is not internal, the algorithm returns to act 1210. If the occupant is internal, then the algorithm at act 1240 determines whether the CDP data package received at act 1210, is consistent with the CDP data package received for that particular occupant in the previous cycle. If the CDP data package is not consistent with said previous CDP data package, then the algorithm at act 1250 launches a slot discovery for said particular occupant. After act 1250, the algorithm returns to act 1210. If the CDP data package is consistent with said previous CDP data package, then the algorithm returns to act 1210.

Referring to FIG. 12, another aspect of the system is that the act 1250 may be further comprised of the steps in FIG. 11.

Another aspect of the system is to provide a graphical representation of the ICS chassis indicating what slots are filled and what they are filled with via an internet browser known in the art.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a communications system apparatus with an Ethernet backplane and at least one internal occupant, a method for identifying internal occupants comprising:
   verifying that a system switch processor ("SSP") has been assigned an IP address;
   requesting a discovery protocol data package from said SSP;
   determining whether said discovery protocol data package corresponds to said at least one internal occupant; and
   if said discovery protocol data package corresponds to said at least one internal occupant, then discovering occupant information corresponding to said at least one internal occupant.

2. The method of claim 1, including the additional act of determining whether said at least one internal occupant is the last internal occupant in said apparatus.

3. The method of claim 1 further including after said query of determining whether said discovery protocol data package corresponds to said at least one internal occupant, the additional act of:

determining whether said at least one internal occupant has a valid IP address, if the discovery protocol data package corresponds to said at least one internal occupant.

4. The method of claim 1 including the additional act of populating a data table with said at least one internal occupant's information.

5. The method of claim 1 wherein the act of discovering occupant information corresponding to said at least one internal occupant further comprises:
   determining whether said at least one internal occupant is a multiservice route processor;
   discovering multiserver route processor information from said at least one internal occupant, if said at least one internal occupant is a multiservice route processor;
   determining whether said at least one internal occupant is a system processing engine;
   discovering system processing engine information from said at least one internal occupant, if said at least one internal occupant is a system processing engine; and
   indicating an error for said at least one internal occupant if said at least one internal occupant is not a system processing engine.

6. A communications system apparatus comprising:
   an Ethernet backplane;
   at least one internal occupant operatively coupled to said backplane; wherein said at least one internal apparatus occupant is configured to identify internal other occupants of said communications system wherein said at least one internal occupant is further configured to:
   verify that a system switch processor ("SSP") has been assigned an IP address;
   request a discovery protocol data package from said SSP;
   determine whether said discovery protocol data package corresponds to said at least one internal occupant; and
   discover occupant information corresponding to said at least one internal occupant if said discovery protocol data package corresponds to said at least one internal occupant.

7. The communications system apparatus of claim 6, wherein said at least one internal occupant is further configured to determine whether said at least one internal occupant is the last internal occupant in said apparatus.

8. The communications system apparatus of claim 6, wherein said at least one internal occupant is further configured to determine whether said at least one internal occupant has a valid IP address, if the discovery protocol data package corresponds to said at least one internal occupant.

9. The communications system apparatus of claim 6, wherein said at least one internal occupant is further configured to populate a data table with said at least one internal occupant's information.

10. An apparatus for identifying internal occupants of a communications system apparatus with an Ethernet backplane and at least one internal occupant comprising:
    means for verifying that a system switch processor ("SSP") has been assigned an IP address;
    means for requesting a discovery protocol data package from said SSP;
    means for determining whether said discovery protocol data package corresponds to said at least one internal occupant; and
    means for discovering occupant information corresponding to said at least one internal occupant, if said discovery protocol data package corresponds to said at least one internal occupant.

11. The apparatus of claim 10, further comprising the additional means for determining whether said at least one internal occupant is the last internal occupant in said apparatus.

12. The apparatus of claim 10 further comprising the additional means for determining whether said at least one internal occupant has a valid IP address, if the discovery protocol data package corresponds to said at least one internal occupant.

13. The apparatus of claim 10 further comprising the additional means for populating a data table with said at least one internal occupant's information.

14. A non-transitory computer readable storage medium readable by a machine, tangibly embodying a program of instructions executable by the machine to perform a method for identifying internal occupants of a communications system apparatus with an Ethernet backplane and at least one internal occupant, said method comprising:
    verifying that a system switch processor ("SSP") has been assigned an IP address;
    requesting a discovery protocol data package from said SSP;
    determining whether said discovery protocol data package corresponds to said at least one internal occupant; and
    if said discovery protocol data package corresponds to said at least one internal occupant, then discovering occupant information corresponding to said at least one internal occupant.

15. The non-transitory computer readable storage medium of claim 14, wherein said method includes the additional act of determining whether said at least one internal occupant is the last internal occupant in said apparatus.

16. The non-transitory computer readable storage medium of claim 14, wherein said method further includes after said query of determining whether said discovery protocol data package corresponds to said at least one internal occupant, the additional act of:
    determining whether said at least one internal occupant has a valid IP address, if the discovery protocol data package corresponds to said at least one internal occupant.

17. The non-transitory computer readable storage medium of claim 14, wherein said method includes the additional act of populating a data table with said at least one internal occupant's information.

18. The non-transitory computer readable storage medium of claim 14, wherein said act of discovering occupant information corresponding to said at least one internal occupant further comprises:
    determining whether said at least one internal occupant is a multiservice route processor;
    discovering multiserver route processor information, if said at least one internal occupant is a multiservice route processor;
    determining whether said at least one internal occupant is a system processing engine;
    discovering system processing engine information from said at least one internal occupant, if said at least one internal occupant is a system processing engine; and
    indicating an error for said at least one internal occupant if said at least one internal occupant is not a system processing engine.

* * * * *